United States Patent [19]

Burgess, Jr. et al.

[11] Patent Number: 4,676,711
[45] Date of Patent: Jun. 30, 1987

[54] MOVING GATE DISCHARGE

[75] Inventors: Ralph D. Burgess, Jr., Plymouth; Stanley L. Davis, Maple Grove, both of Minn.

[73] Assignee: Food Engineering Corporation, Minneapolis, Minn.

[21] Appl. No.: 832,983

[22] Filed: Feb. 25, 1986

Related U.S. Application Data

[63] Continuation of Ser. No. 722,342, Apr. 12, 1985, abandoned, which is a continuation of Ser. No. 479,273, Mar. 28, 1983, abandoned.

[51] Int. Cl.$^4$ .............................................. B65G 67/00
[52] U.S. Cl. .................................. 414/327; 198/623; 239/659; 239/679; 414/503; 414/505
[58] Field of Search ................ 198/623; 414/327, 502, 414/503, 505; 222/405, 406; 239/672, 679, 659

[56] References Cited

U.S. PATENT DOCUMENTS

| | | |
|---|---|---|
| 1,248,303 | 11/1917 | Fromme . |
| 1,651,633 | 12/1927 | Ross . |
| 2,717,703 | 9/1955 | Kull et al. . |
| 3,435,967 | 4/1969 | Sackett, Sr. . |
| 3,735,881 | 5/1973 | Wilding .............................. 214/152 |
| 3,774,785 | 11/1973 | Gasseling . |
| 3,811,585 | 5/1974 | Wilding .............................. 214/152 |
| 3,877,585 | 4/1976 | Burgess, Jr. . |
| 3,921,853 | 11/1975 | Burgess, Jr. .......................... 198/623 |
| 4,304,326 | 12/1981 | Fowler .................................. 198/623 |

Primary Examiner—Joseph E. Valenza
Attorney, Agent, or Firm—Schroeder & Siegfried

[57] ABSTRACT

A moving gate discharge system designed to prevent product-breakage while discharging particulate products, particularly non-free flowing and inter-engaging particulate products, in a more uniform flow from a receptacle having a moving bottom, is disclosed. The system includes an endless circulating feeder mounted across the discharge of the receptacle with its lower end portion oscillating upwardly and downwardly and traveling at a horizontal speed more rapid than that of the product on the moving bottom of the receptacle. Product-progressing finger assemblies are mounted in transverse rows on the feeder, spaced distances equal to the longitudinal distance the feeder moves during one period of vertical movement of the lower end portion thereof, and located such that each will be disposed directly below the lower end portion of the feeder when the latter reaches the lower portion of its downward movement. The fingers are positioned so as to move in close proximity to the moving bottom of the receptacle as the feeder reaches its lowermost position. The feeder is arranged so that its fingers move forwardly beyond the discharge of the moving bottom of the receptacle as they pass thereabove so as to effectively move substantially all of the product off the discharge portion of the moving bottom. The lower rung of the feeder is guided by a track along a convex path, the radius of curvature of which is preferably approximately three quarters of the distance between the upper and lower axes of revolution of the feeder. An additional transverse row of such fingers is preferably located between each pair of adjacent in-phase rows to facilitate the movement of the material.

19 Claims, 5 Drawing Figures

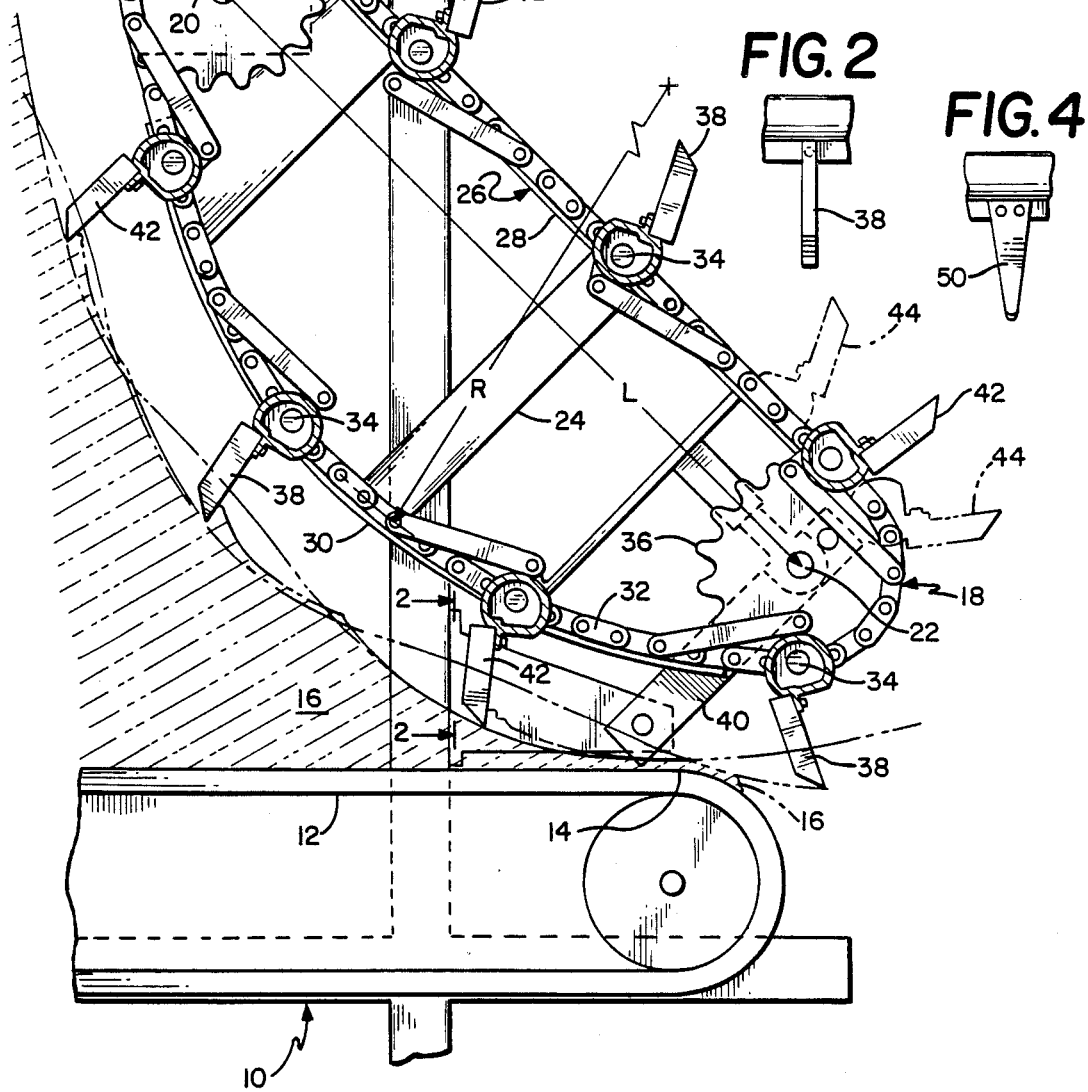

MOVING GATE DISCHARGE

This is a continuation of application Ser. No. 06/722,342, filed Apr. 12, 1985, which is a continuation of application Ser. No. 06/479,273, filed Mar. 28, 1983, both abandoned.

DESCRIPTION

Background of the Invention

Some products, particularly those which are nonfree flowing, continue to present difficult problems for manufacturers in operations requiring uniform feeding of the product. This is especially the case for products such as macaroni noodles, cut-filter tobacco, strip tobacco potato chips, cereal flakes, and the like which because of unusual shapes or composition of the product tend to "pitch-fork" as they are fed or progressed during handling of the same in prior various manufacturing or packaging operations. Such operations necessarily require a uniform flow of the product which is very difficult to obtain with such products, since a characteristic of "pitch-forking" is the building up, breaking loose and descending of a relatively large body of the product when only a thin layer thereof has been engaged by the feeding mechanism. Although the Moving Gate Discharge disclosed in the earlier U.S. Pat. No. 3,921,853 provided a much more uniform flow of particulate products then had theretofor been possible, certain products still present serious problems because of the physical characteristics of these products, as described above. In connection with such products, accumulations thereof tend to build up adjacent the discharge of the moving bottom of the bin and to suddenly break loose in large accumulations, thereby providing as uneven or non-uniform discharge function.

In addition to the above, certain types of products tend to compact while in the feeding bin because of the depth and nature of the product, with the result that they are more dense by the time they reach the point of discharge. This in turn creates further product breakage unless special treatment is provided. Some have sought to overcome this problem by mounting a plurality of rotary rollers, helical flights, paddles, fingers, tines or augers across the discharge area so as to engage and loosen the product at the forward edge of the receptacle as it moves outwardly at the desired point of discharge. Such rotary rollers, helical flights, paddles, fingers, tines or augers tend to shave and break up products such as macaroni noodles, cut-filler tobacco, strip tobacco, and the like the individual pieces of which tend to interengage and crosslink so as to cling to each other more than other types of products.

None of the devices heretofore known have been adequate to overcome the problems outlined hereinabove. The feeding system which we have designed and disclose herein however, does overcome these disadvantages. It will be noted that although it resembles in appearance the moving gate discharge system shown in the above patent, it is constructed and operates on a principle that is different from that utilized in the system disclosed in that patent.

Summary of the Invention

The invention is comprised of a continuous feeder the lower end of which oscillates upwardly and downwardly and has product-progressing fingers arranged in transverse rows which are spaced in phase with the pitch diameter of the sprockets at its lower end and are positioned so as to be located directly below said sprockets as the lower end of the feeder reaches its lowermost position in each of its periods of oscillation. In addition, we have provided a markedly convex track for the lower rung of the feeder and have positioned the axis of rotation of said sprockets so as to be located forwardly of the point of discharge of the moving bottom of the product supply bin. This combination causes the fingers to swing forwardly beyond the discharge point and to sweep the forward end portion of the bottom conveyor substantially clean of the product, thereby precluding any build-up and insuring uniform discharge of the product. In addition, the sharp radius of the lower portion of the track for the lower rung of the feeder, which is particularly adapted for moving the compacting type products identified hereinabove, causes the feeder to increasingly reduce the depth of the product as the fingers move toward the discharge point and thereby increasingly remove the load from over the compacted product that is on the moving bottom of the bin.

BRIEF DESCRIPTION OF THE DRAWINGS

A detailed description of one preferred embodiment of the MOVING GATE DISCHARGE is hereafter described with specific reference being made to the drawings in which:

FIG. 1 is a fragmentary side elevational view of the discharge end of a receptacle having a moving bottom with my novel moving gate mounted thereacross, and with alternative positions of the intermediate fingers shown in phantom;

FIG. 2 is a fragmentary rear elevational view of a product-progressing finger taken along line 2—2 of FIG. 1.

FIG. 3 is a fragmentary side elevational view of a second form of product-progressing finger;

FIG. 4 is a rear elevational view taken along line 4—4 of FIG. 3; and

FIG. 5 is a side elevational view of a third form of product-progressing finger used for certain types of product.

The preferred embodiment of our invention is shown in solid lines in FIGS. 1-2 and includes a frame F which supports a receptacle or bin having a moving bottom conveyor 12 in the form of a continuous conveyor which is intended to discharge from the bin as at 14 at which point it commences to move downwardly from its horizontal level of support and no longer supports the product 16 at that level as shown. An endless circulating feeder 18 is mounted upon the frame F across the discharge 14 of the bin and with the moving bottom conveyor 12 comprises a moving gate discharge system. The feeder 18 is mounted and driven in a manner similar to the manner in which the feeder of U.S. Pat. No. 3,921,853 to which reference may be made and which is hereby incorporated herein by reference thereto.

The feeder 18 is mounted at its upper end for oscillating upward and downward movement of its lower end upon shaft 20 which supported by frame F and at its outer end for rotation, by support means which is not shown. The shaft 20 is rotated about its longitudinal axis by rotative power means, not shown, to drive the feeder.

At the lower end of the feeder 18 is a rotatably mounted shaft 22 which is mounted upon the frame 24 of the feeder in the same manner as the corresponding shaft in the above patent. A track 24 which has a straight upper rung 28 and a convex lower rung 30 is fixedly mounted on frame 24 at each of its sides and guides a chain 32 therewithin. Extending transversely across the frame between said chains 32 and rotably mounted thereon is a plurality of spaced transverse bars or shafts 34 which are spaced equidistantly from each other a distance equal to the circumference of each of a pair of sprocket wheels 36 carried by the shaft 22 with which they rotate. In other words, the shafts 34 are mounted in phase with the pitch diameter of the sprocket wheels 36.

Each of the shafts 34 support a transverse row of depending product-progressing fingers, tongues or tines 38 which are rotatably mounted thereon in the same manner as the tines shown in the above patent so as to rotate rearwardly and move upwardly in a withdrawing action relative to the product as its supporting bar or shaft 34 moves outwardly beyond the shaft 22. The purpose of such rotation and rearward movement of the fingers as they disengage from the product at the discharge location is to keep them from rotating fast at discharge, which could throw and scatter or damage the product.

The upward and downward movememt of the lower end of the feeder 18 is induced and controlled in the same manner as shown in the above patent. As indicated in said patent, the extent of vertical movement of the lower end of the feeder can be varied, but we prefer to limit the vertical swing to approimxately three to four (3-4) inches. The sprocket wheels 36 are mounted eccentrically on pivot arms 40 and drive chains 32 induce such vertical swing or oscillation of the lower end of the feeder.

Mounted upon chains 32 between each transverse row of fingers 38 is a parallel transverse row of auxiliary fingers 42. These fingers 42 are mounted upon the chains in the same manner as fingers 38 and in the same manner as the tines of the above patent. These fingers 42 serve to engage the product at a point behind the crest of the product left by the immediately preceding finger 38 as best shown in FIG. 1. As shown in solid lines in FIG. 1, these fingers 42 are spaced equidistantly between fingers 38. For some products, however, we have found it advantageous to place fingers 44 (shown in broken lines), in lieu of fingers 42, in ever-decreasing proximity to the leading row of fingers 38. The preferred arrangement, however, is as shown in solid lines in FIG. 1.

As shown in FIG. 1 the product-progressing fingers 38, in addition to being spaced in phase with the pitch diameter of the sprocket wheels 36, are so located on chains 32 that each finger 38 will move directly below shaft 22 as the lower end of feeder 18 reaches the lowermost point of its oscillation.

As also shown in FIG. 1, the feeder 18 is mounted so that the axis of shaft 22 is located forwardly of the discharge point 14 of bottom conveyor 12, with the result that each finger 38 swings outwardly beyond and below that discharge point, thereby effectively wiping the end of the conveyor 12 substantially free of accumulated product and preventing undesireable build-up of product which would produce non-uniform feeding.

The paths of the rows of fingers 38 and that of the fingers 42 and the relationship therebetween is illustrated in FIG. 1. It will be seen that the fingers 42 enter the product left behind and between the fingers 38 behind the crest of such material and lift the same upwardly as it is progressed forwardly. As a consequence, the trailing fingers 38 likewise enter the product left by the fingers 42 behind the crest thereof and lift the same upwardly and forwardly to effectively minimize breakage of the product by not having continuous engagement with the product, which can have the effect of fingers digging into the product and engaging large quantities of product, and which can cause product breakage and adversely affect the continuous rate of discharge.

By reference to FIG. 1 it wil be seen that track 30 for lower rung of chain 32 descends steeply at its upper end adjacent shaft 20 and thereafter has a large "belly" or arc formed about a radius of about 38 inches and has an arc length of about 68°. As shown, the radius is approximately three fourth (¾) the length of the distance between the shafts 20 and 22. The purpose in having the pronounced "belly" or convex shape in the track 30 is to minimize the adverse effects of the tendency of certain products to compact and become relatively dense by the time they reach the point of discharge 14. We have found that the early removal of the compacted product 16, and of long and thin or slender products, which is caused by the steep descent of the fingers 38 and 42, greatly diminishes the period during which the lower strata of the product is subjected to the considerable weight of the upper levels of the product and, as a consequence, the degree of compaction suffered by the lower levels of product is greatly diminished. As a direct result, the product can be progressed forwardly more easily and discharged with substantially less breakage, particularly for products which have a greater tendency to compact, and which also may be long and thin or slender. By reference to FIG. 1, it will be seen that initially the fingers enter the product along a very steep path in areas where the product is relatively loose, and then progressively enter the product along a less steep path and lift the product as they progress toward the discharge to move the randomly sized particles off the discharge of the conveyor 12 in a uniform manner.

The fingers 38, as shown in FIG. 1-2 are preferably rectangular in cross-section and have a leading edge 46 and beveled end surface 48 which entend upwardly and rearwardly from its leading edge. We have found fingers of this type particularly effective in uniformly progressing products such as elbow macaroni, strip tobacco, or cut-filler tabacco, which are characterized by their random size and shapes and which are generally long and thin or slinder and tend to interengage and inter-lock with each other.

FIGS. 3 and 4 illustrate another form of product progressing finger 50 which is generally triangularly shaped with the apex of the triangle at the outer lower end of the finger.

FIG. 5 illustrates still another form of products-progressing finger 52 or tine which is slightly concave in configuration and is more effective for certain types of products. Each of the fingers 38, 44, 50 and 52 is mounted on the chains 32 in the same manner as described in U.S. Pat. No. 3,921,853.

The feeder 18 should extend at about 45° relative to horizontal, and between the angle of flow and angle of repose of the product. The upper portion of the track 30 for the lower ring of the feeder extends downwardly at about a 30° angle relative to the longitudinal axis of the feeder 18.

Reference may be made to U.S. Pat. No. 3,921,853 for further guidance with respect to features of the construction and arrangement of the feeder 18 not shown or specifically described hereon.

We have found that the above construction and arrangement produces a much more uniform discharge than any heretofore achieved, especially for non-free-flowing products such as macaroni noodles, cut-filler tobacco, strip tobacco, flakes, chips and the like. We have been successful in greatly reducing the likelihood of "pitch forking" and consequently, irregular discharging of relatively large amounts of the product. In addition, accumulation of the product at the end of the bottom conveyor is precluded by the forward and downward movement of the fingers over the discharge of the bottom conveyor as the feeder is at its lowermost portion of its period of oscillation. In addition, the amount of product breakage is substantially reduced, particularly for products which tend to compact while in the supply receptacle from which the product is being discharged, in that the depth of the supply of the product is reduced at an early stage of its movement toward the discharge point, and therefore the product has less load over the top of it and therefore is less dense and it is engaged and moved off the end of the conveyor.

In considering this invention, it should be remembered that the present disclosure is illustrative only and the scope of the invention should be determined by the appended claims.

What is claimed is:

1. A moving gate discharge system for discharging, in a uniform flow from a receptacle having a moving bottom, particulate products of the type of particles of which tend to intertwine and interconnect because of their shape, construction or nature comprising:
   (a) a receptacle having a moving bottom conveyor and an ultimate discharge at its forward end at which said conveyor discharges;
   (b) an inclined elongated feeder mounted across said discharge of said receptacle;
   (c) said feeder being mounted for movement between an upper and lower terminal;
   (d) said feeder having a lower end portion adjacent said ultimate discharge of said receptacle and having its longitudinal axis extending at an angle relative to horizontal which is less than the angle of repose of the particulate product to be discharged from said receptacle;
   (e) said lower end portion of said feeder being mounted to permit rising and falling action thereof to a position above and closely adjacent to said discharge of said moving bottom conveyor;
   (f) a plurality of product-progressing members carried by said feeder at points spaced equidistantly and longitudinally thereof in product engaging position and moved therealong therewith at a speed sufficient to cause the same to progress the particulate product on said conveyor forwardly relative to the latter when engaged thereby;
   (g) said members being spaced on said feeder a distance equal to the longitudinal distance said feeder travels as its lower end portion moves through one period of its said rising and falling motion, and being located on said feeder so that one of said members is always disposed directly below said lower end portion as the latter reaches the lowermost portion of its said falling motion in order to effectively move substantially all of the product thereat off the discharge portion of said moving bottom conveyor;
   (h) means for causing said lower end portion of said feeder to rise and fall regularly is a direct relationship to the movement of said feeder through a distance equal to the longitudinal spacing between said product-progressing members; and
   (i) power means operatively connected to said feeder for causing the same to so move.

2. The structure defined in claim 1 wherein said feeder is so constructed and arranged that said product-progressing members move about an axis which is disposed beyond the forwardmost portion of said conveyor.

3. The structure defined in claim 1 wherein said feeder is so constructed and arranged that said product-progressing members are moved in very close proximity and above the forward end portion of said conveyor as said members pass around said lower end portion of said feeder, in order to effectively move forwardly relative to said conveyor substantially all of the particulate product supported by the extreme forward end portion of said conveyor.

4. The structure defined in claim wherein said product-progressing members are depending fingers and said structure includes mechanical means mounting said fingers upon said feeder and being constructed and arranged to cause said fingers to pivot rearwardly as they move beyond said discharge of said receptacle and about said lower terminal of said feeder.

5. The structure defined in claim 1 wherein said product-progressing members are tines and said structure includes mechanical means mounting said tines upon said feeder and being constructed and arranged to cause said tines to pivot upwardly and rearwardly as they move past said discharge of said receptacle and about said lower terminal of said feeder.

6. The structure defined in claim 1 wherein said feeder is comprised of an elongated continuous conveyor having an axis of revolution at its said lower terminal disposed forwardly of the forward-most portion of said first mentioned conveyor.

7. The structure defined in claim 1 wherein said product-progressing members comprise a first set of equidistantly spaced transverse rows of fingers and
   (j) a second set of product-progressing fingers carried by said feeder and positioned in transverse rows equidistantly between said first mentioned rows of fingers.

8. The structure defined in claim 1 wherein said product-progressing members are rectangular in cross-section and having a leading product-engaging edge and an inwardly beveled terminal surface extending rearwardly from said leading edge.

9. The structure defined in claim 1 wherein said product-progressing members are tines which are curved concavely and extend forwardly in the direction of motion of said feeder.

10. The structure defined in claim 1 wherein said feeder is an endless circulating conveyor having an upper and a lower rung, and
   (j) a convexly-shaped track supported by said receptacle and guiding said lower rung of said feeder as it moves, the portion of said track adjacent said lower terminal having an arc length approximating 68°.

11. The structure defined in claim 1, wherein said feeder is an endless circulating conveyor having upper and lower rungs; and
  (j) a convexly-shaped track supported by said receptacle and guiding the lower rung of said feeder as it moves, said feeder and the portions of said track adjacent said lower terminal being constructed and arranged so that said portions of said track extend substantially parallel to the portions of said receptacle conveyor adjacent its discharge when said feeder is at the lowermost portion of its falling motion.

12. The structure defined in claim 1 wherein said feeder is an endless circulating product progessor and has an upper and lower rung and includes a pair of transversely spaced sprocket wheels defining the lower axis thereof;
  (j) said product-progressing members being constructed and arranged in an in-phase relationship with respect to the pitch diameter of said sprocket wheels; and
  (k) a convexly-shaped track supported by said receptacle and guiding the lower rung of said feeder as it moves, the radius of curvature of said track in the portions thereof adjacent the lower terminal of said feeder being substantially less than that of its portions adjacent the upper terminal of said feeder.

13. The structure defined in claim 1 wherein said feeder is a conveyor having a convex lower rung the radius of curvature of which is approximately three fourths the length of the longitudinal axis of said conveyor.

14. The structure defined in claim 1, wherin the longitudinal axis of said feeder extends at approximately 45° to the plane of said conveyor.

15. The structure of claim 1 wherein said feeder is a circulating conveyor having upper and lower rungs and upper portions of the lower rung of said feeder extend at approximately 30° to the longitudinal axis of said feeder.

16. The structure defined in claim 1 wherein said feeder is a conveyor having upper and lower rungs, the lower rung of said feeder being convex and having a radius of curvature approximating 38 inches.

17. A moving gate discharge system for discharging, in a uniform flow from a receptacle having a moving bottom, particulate products of the type the particles of which tend to intertwine and inter-engage each other because of their shape and construction comprising:
  (a) a receptacle having a moving bottom conveyor and an ultimate discharge at its forward end;
  (b) an inclined elongated feeder mounted across said discharge of said receptacle;
  (c) said feeder being mounted for movement between an upper and lower terminal;
  (d) said feeder having a lower end portion adjacent said ultimate discharge of said receptacle and having its longitudinal axis extending at an angle relative to horizontal which is less than the angle of repose of the particulate product to be discharged from said receptacle;
  (e) said lower end portion of said feeder being mounted to permit rising and falling action thereof to a position above and closely adjacent to said discharge of said moving bottom conveyor;
  (f) a plurality of product-progessing finger comprising a first set carried by said feeder in longitudinally spaced transverse rows at points spaced equidistantly and longitudinally thereof and constructed and arranged to be moved therealong at a speed sufficient to cause the same to progress the particulate product on said conveyor forwardly relative to the latter when engaged thereby;
  (g) said fingers being spaced a distance equal to the longitudinal distance said feeder travels as its lower end portion moves through one period of its said rising and falling motion and being located on said feeder so one of said fingers is always disposed directly below said lower end portion as the latter reaches the lowermost portion of its said falling motion in order to effectively move sustantially all of the product thereat off the discharge portionof said moving bottom conveyor;
  (h) means for causing said lower end portion of said feeder to rise and fall regularly in a direct relationship to the movement of said feeder through a distance equal to the longitudinal spacing between said product-progressing members; and
  (i) power means operatively connected to said feeder for causing the same to so move; and
  (j) a second set of product-progressing fingers carried in transverse rows by said feeder, one row each of which is disposed between an adjacent pair of rows of said first set of fingers.

18. The structure claimed in claim 17 wherein each row of said second set of product-progressing fingers is spaced equidistantly from the adjacent transverse rows of said first set.

19. The structure claimed in claim 17 wherein each row of said second set of product-progressing fingers is located progressively closer to its trailing adjacent row of fingers from said first set than the preceding row of said second set is located with respect to its adjacent and trailing row of fingers from said first set.

* * * * *

UNITED STATES PATENT AND TRADEMARK OFFICE
CERTIFICATE OF CORRECTION

PATENT NO. : 4,676,711

DATED : June 30, 1987

INVENTOR(S) : Ralph D. Burgess, Jr. and Stanley L. Davis

It is certified that error appears in the above-identified patent and that said Letters Patent is hereby corrected as shown below:

Column 4, line 45, change "entend" to --extend--.

Column 4, line 51, change "slinder" to --slender--.

Column 6, line 5, change "is" to --in--.

Column 6, line 25, change "claim" to --claim 1--.

Column 8, line 15, change "finger" to --fingers--.

Signed and Sealed this

Twenty-ninth Day of March, 1988

Attest:

DONALD J. QUIGG

Attesting Officer

Commissioner of Patents and Trademarks